Patented May 1, 1951

2,551,386

UNITED STATES PATENT OFFICE 2,551,386

WRINKLE FINISH COMPOSITION

Eugene W. Moffett, Milwaukee, Wis., assignor to Pittsburgh Plate Glass Company, Allegheny County, Pa., a corporation of Pennsylvania No Drawing. Application April 4, 1946,
Serial No. 659,657

5 Claims. (Cl. 260—33.6)

The present invention relates to coating materials embodying solutions of synthetic resins dissolved in appropriate solvents and being designed for application to various surfaces to be preserved or decorated. The invention has particular relation to coating materials designed to dry upon a surface to be coated in such manner as to form a so-called "wrinkle finish."

One object of the invention is to provide a coating composition designed to dry to form a "wrinkle finish" which composition does not embody a drying oil.

A second object is to provide a resinous composition which can be dissolved in cheap solvents to provide compositions which when spread as a film will dry to provide a "wrinkle finish."

These and other objects of the invention will be apparent from consideration of the following specification and the appended claims.

Heretofore, it has been observed that certain of the drying oils, compositions, notably those containing glycerides of conjugately unsaturated fatty acids such as occur in tung oil, when admixed with an excess of drier such as cobalt oleate or the like and applied to a surface to be coated would dry in such manner as to form a roughened or wrinkled surface of fine grain or texture. For many applications, such as the coating of scientific instruments or similar articles so-called "wrinkle" finishes were pleasing and efficient. During the recent World War and since the war, however, oils such as tung oil capable of very rapid drying, required in the manufacture of these finishes have been difficult to obtain and it has been desirable to obtain a composition containing no tung oil but capable of drying to provide a "wrinkle" finish.

In accordance with the provisions of the present invention, such material has now been obtained. This material comprises as its main component a polyester of 3,6-endomethylene-Δ-4-tetrahydrophthalic anhydride or its corresponding acid and a suitable glycol such as diethylene glycol or dipropylene glycol. The resins of this type can readily be dissolved in relatively inexpensive solvents such as toluol to form coating compositions which are capable of drying quickly when baked to form wrinkle finishes.

Esters of 3,6-endomethylene-Δ4-tetrahydrophthalic acid suitable for preparing polyesters are readily prepared by heating a charge comprising 3,6-endomethylene-Δ4-tetrahydrophthalic acid or its anhydride and the desired glycol such as diethylene glycol or 1,2-dipropylene glycol to a reaction temperature. The 3,6-endomethylene-Δ4-tetrahydrophthalic acid or anhydride is easily prepared by Diels-Alder type reaction of maleic acid or anhydride and cyclopentadiene. Since the reaction is well known, it need not be described in detail.

To prepare a polyester, 3,6-endomethylene-Δ4-tetrahydrophthalic acid or the anhydride thereof preferably is admixed with the desired glycol in approximately equimolar proportions, though some excess (e. g. 10 or 20% excess) of glycol is permissible. Catalysts such as sulfuric acid conventionally employed in the preparation of esters and a hydrocarbon solvent of relatively high boiling point such as xylol may be included, the latter in small amount, for example, 5 to 10% based upon the total mixture. The mixture is reacted in a vessel equipped with a stirrer and a vapor condensing system of sufficient capacity to permit separation of the evolved water and the condensed solvent vapor and the return of the latter to the reaction zone. During the reaction, an inert atmosphere such as carbon dioxide or nitrogen may be passed through the reaction mixture in order to assist in eliminating water from the reaction zone. Of course, the temperature of heating is sufficient to effect reaction between the acid or its anhydride and the glycol but should not be so high as to cause excessive volatilization of the reaction components. The reaction should be continued until the acid value of the ester is satisfactorily low. For example, within a range of 75 down to 5 or even lower, 5–20 being a good average. In no event should the reaction be continued until excessive gellation of the polyester has occured. The following is a typical time-temperature schedule for the reaction:

| Time | Temperature |
|---|---|
| 0 to 2 hours | Room temperature up to 150° C. |
| 2 to 30 hours | 150 to 240° |

The above schedule applies to both diethylene glycol and 1,3-dipropylene glycol.

The following constitute specific examples illustrating the preparation of polyesters useful in the preparation of coating compositions embodying the invention:

Example 1

A mixture of 328 parts by weight of 3,6-endomethylene-Δ-4-tetrahydrophthalic anhydride, 140 parts by weight of ethylene glycol and 26 parts by weight of toluene was heated in half an hour to 160° C. in a container equipped with an agitator, thermometer, and a vapor condensing system which permitted removal of the water formed as condensed with the solvent returning continuously to the reaction zone. The batch was held at 160–175° C. for 22 hours, 15 parts by weight additional ethylene glycol added, and the same temperature held for seven more hours. Solvent was then drained to permit the temperature to rise to 230° C. which was held a half hour. The product was thinned to approximately 60% solids with toluene and it had an acid number of 14. The product was used to give clear or pigmented wrinkle finishes.

*Example 2*

In the same type of equipment 328 parts by weight of 3,6 - endomethylene-Δ- 4 tetrahydrophthalic anhydride, 170 parts by weight of propylene glycol and 26 parts by weight of toluene were heated to 165° C. in a short time. The temperature rose slowly as water was evolved to 190° in 7.5 hours. This temperature was held for 3 hours, solvent was drained from the system so that the temperature rose to above 225° C. which was held one hour. The batch was thinned with toluene to 66% solids and had a body of S (on the Gardner-Holdt scale) and an acid number of 9.3.

This resin and that of Example 1 give wrinkle finishes of relatively fine but shallow texture. The products of the following examples are more versatile and the wrinkle pattern may be varied by known methods.

*Example 3*

The propylene glycol of Example 2 was replaced with 240 parts by weight of diethylene glycol and the batch heated to 185° C. in a half hour. The temperature in the reaction vessel was allowed to climb as the reaction proceeded and reached about 200° in three hours. At the end of four more hours it was approximately 225° C. which was held for an hour at which time foaming started. The batch was thinned with toluene to 61% solids. The solution had a V body and an acid number of 16. When properly formulated in clear or pigmented finishes the resin formed wrinkles of uniform pattern and good definition.

*Example 4*

In a similar manner 330 parts by weight of dipropylene glycol and 328 parts by weight of 3,6-endomethylene- Δ - 4 -tetrahydrophthalic anhydride and 26 parts by weight of toluene were heated together in esterification equipment. The temperature was allowed to increase slowly after reaching 160° C. After about seven hours it reached 225° C. and was held in this range for one hour. The ester thickens rather rapidly near completion of the process. The product was thinned to approximately 60% solids in toluene and had a body of K and an acid No. of 9.

All of these resins were light in color and yielded hard, tough finishes.

A polyester of long chain length of 3,6-endomethylene-Δ-4-tetrahydrophthalic acid or its anhydride and a glycol such as diethylene glycol or dipropylene glycol prepared by the foregoing procedure and preferably of an acid number within a range 5 to 40 may be dissolved in an inexpensive solvent such as an aromatic hydrocarbon. Such solvent includes some aromatic hydrocarbons, but it is a relatively crude mixture thereof and has a volatility between that of kerosene and gasoline. To this solution, may be added driers of the type conventionally employed by the paint industry in order to promote the drying or setting of varnish and paint films. Driers of this type include the conventional lead, nickel or cobalt oleates and resinates as well as the naphthenates. Other driers capable of promoting the hardening of drying oil films may also be included. The driers are usually employed in fairly small amounts, for example, within a range of .5 to 5% based upon the resin components. It will be apparent that non-reactive resins such as conventional alkyd resins may be included in the solution so long as they are not in such amounts as unduly to impair the wrinkling characteristics of the films obtained from the solutions.

The amounts of the 3,6-endomethylene-Δ-4-tetrahydrophthalic esters employed in the solutions will depend upon the viscosity desired in the solution as well as the thickness per coating. In general, the viscosity will depend upon the mode of application and the drying characteristics selected for the material. For example, for spray-gun application a solution should be relatively thin; that is, it should include a lower percentage of alkyds than solutions designed for brush application. Viscosity can also be controlled by the degree of esterification in the polyesters. The more complete the esterification the more viscous the resultant solution's concentration other factors being equal.

Pigments such as titanium dioxide, lithopone, basic lead carbonate, carbon black and others may be included in the varnish composition in a ratio varying, for example, within a range of 5 to 75% based upon the total solids content of the composition. The pigments tend to increase the viscosity of the solutions and in order to compensate for increases it may be desirable to increase the proportion of solvent or diluent such as toluene, xylene or the like.

The improved coating compositions can be applied to any conventional surfaces such as wood or iron or aluminum either with or without preliminary priming with drying oils or other primers.

In order to provide wrinkle finishes of fine and uniform grain the freshly coated articles should be subjected to conventional baking operation in an oven at appropriate temperature, e. g. within a range of 100 to 400° F. or to radiation by electrical heating devices such as infra-red lamps. The baking operation is continued until the films have become firm and hard. Usually this will occur within a period of 15 minutes to 1 hour or 1 hour and one half.

The finished films have a fine grain, pleasing wrinkle texture desired in finishes of this type. They are quite durable and resistant to heat, solvents, greases and oils and the like. One great advantage which they possess resides in the fact that no drying oils, especially the rarer oils containing conjugately unsaturated glycerides such as tung oil are used therein.

The forms of the invention are to be considered merely as representative. It will be apparent to those skilled in the art that numerous modifications may be made therein without departing from the spirit of the invention or the scope of the appended claims.

I claim:

1. A coating composition having a capacity when applied to a surface of drying to a uniform textured wrinkle finish and being composed of a polyester consisting of equi-molecular proportions of 3,6 endomethylene delta 4 tetrahydrophthalic acid and a dihydric alcohol of the class consisting of ethylene glycol, diethylene glycol, propylene glycol and dipropylene glycol, said polyester being admixed with a heavy metal drier for drying oils in a proportion of .5 to 5% based upon resin components and being dissolved in an aromatic hydrocarbon solvent of a group consisting of xylene and toluene.

2. A method of coating surfaces which comprises applying to the surfaces a film of a solution of a polyester of 3,6 endomethylene $\Delta$ 4 tetrahydrophthalic acid and a dihydric alcohol of class consisting of ethylene glycol, diethylene glycol, propylene glycol and dipropylene glycol, said polyester being of an acid value within the range of 5 to 40 and being dissolved in a volatile aromatic hydrocarbon solvent of a class consisting of toluene and xylene and further containing a catalyst of drying oils, evaporating the solvent and baking the film at a temperature at about 100 to 400° F. for a period of 15 minutes to 1½ hours.

3. A method of coating surfaces which comprises applying to the surfaces a film of a polyester consisting of equi-molecular portions of 3,6 endomethylene $\Delta$ 4 tetrahydrophthalic acid and a dihydric alcohol of a class consisting of ethylene glycol, diethylene glycol, propylene glycol and dipropylene glycol, said polyester being of an acid value of 5 to 40 and being admixed with a heavy metal drier for drying oils in a proportion of .5 to 5%, based upon resin components and being dissolved in an aromatic hydrocarbon solvent of a volatility between that of gasoline and kerosene and containing a compound of a class consisting of toluene and xylene, then drying the film and subjecting it to baking at a temperature of 100 to 400° F. for a period of 15 minutes to 1½ hours.

4. A composition as defined in claim 1 which contains 5 to 75% upon the basis of total solids of pigment.

5. A method as defined in claim 3 in which the polyester solution contains 5 to 75% of pigment based upon total solids.

EUGENE W. MOFFETT.

REFERENCES CITED

The following references are of record in the file of this patent:

UNITED STATES PATENTS

| Number | Name | Date |
|---|---|---|
| 2,149,857 | Mikeska et al. | Mar. 7, 1939 |
| 2,195,362 | Ellis | Mar. 26, 1940 |
| 2,318,034 | Wayne | May 4, 1943 |
| 2,319,826 | Pellett | May 25, 1943 |
| 2,385,776 | Daniels et al. | Oct. 2, 1945 |
| 2,397,240 | Butler | Mar. 26, 1946 |
| 2,421,876 | Gerhardt | June 10, 1947 |